(12) United States Patent
Locascio et al.

(10) Patent No.: US 8,337,783 B2
(45) Date of Patent: Dec. 25, 2012

(54) MAGNETIC CONNECTORS FOR MICROFLUIDIC APPLICATIONS

(75) Inventors: Laurie E. Locascio, North Potomac, MD (US); Francisco Javier Atencia-Fernandez, Bethesda, MD (US)

(73) Assignee: The United States of America as represented by the Secretary of Commerce, The National Institute of Standards and Technology, Washington, DC (US)

( * ) Notice: Subject to any disclaimer, the term of this patent is extended or adjusted under 35 U.S.C. 154(b) by 297 days.

(21) Appl. No.: 12/820,218

(22) Filed: Jun. 22, 2010

(65) Prior Publication Data

US 2010/0322826 A1  Dec. 23, 2010

Related U.S. Application Data

(60) Provisional application No. 61/219,556, filed on Jun. 23, 2009.

(51) Int. Cl.
*B01L 99/00* (2010.01)

(52) U.S. Cl. .......... 422/546; 422/50; 422/500; 422/501; 422/502; 422/503; 204/193

(58) Field of Classification Search ............... 422/50, 422/500–503, 546; 204/193
See application file for complete search history.

(56) References Cited

U.S. PATENT DOCUMENTS

| | | | |
|---|---|---|---|
| 3,181,895 A | 5/1965 | Cator | |
| 3,586,043 A | 6/1971 | Duncan | |
| 4,004,298 A | 1/1977 | Freed | |
| 4,030,494 A | 6/1977 | Tenczar et al. | |
| 5,472,598 A | 12/1995 | Schick | |
| 5,533,238 A | 7/1996 | Say | |
| 6,296,503 B1 | 10/2001 | Shimada | |
| 6,910,503 B2 | 6/2005 | Schick et al. | |
| 7,191,798 B2 | 3/2007 | Edelman et al. | |
| 7,311,526 B2 | 12/2007 | Rohrbach et al. | |
| 2002/0166592 A1* | 11/2002 | Liu et al. | 137/825 |
| 2006/0003439 A1 | 1/2006 | Ismagilov et al. | |
| 2006/0094119 A1 | 5/2006 | Ismagilov et al. | |
| 2008/0143098 A1 | 6/2008 | Zimmermann et al. | |
| 2009/0121476 A1 | 5/2009 | Malito et al. | |

* cited by examiner

*Primary Examiner* — Jyoti Nagpaul
(74) *Attorney, Agent, or Firm* — Steve Witters; Witters & Associates

(57) ABSTRACT

A magnetic connector assembly for microfluidic devices comprises a first magnetic connector with at least one orifice extending therethrough and a second magnetic connector. The first and second connectors are configured to magnetically attract each other. In one aspect, the first magnetic connector is configured to sealingly engage a surface of a microfluidic chip with the second magnetic connector disposed on an opposite side of the microfluidic chip. The first magnetic connector is configured to seal with the microfluidic chip about a channel opening in the microfluidic chip and provide flow communication between the channel opening and the orifice in the first magnetic connector. In at least one other aspect, the first magnetic connector and second magnetic connector each have at least one orifice and are configured to change a flow communication therebetween upon a rotation of the first or second magnetic connector with respect to the other magnetic connector.

20 Claims, 9 Drawing Sheets

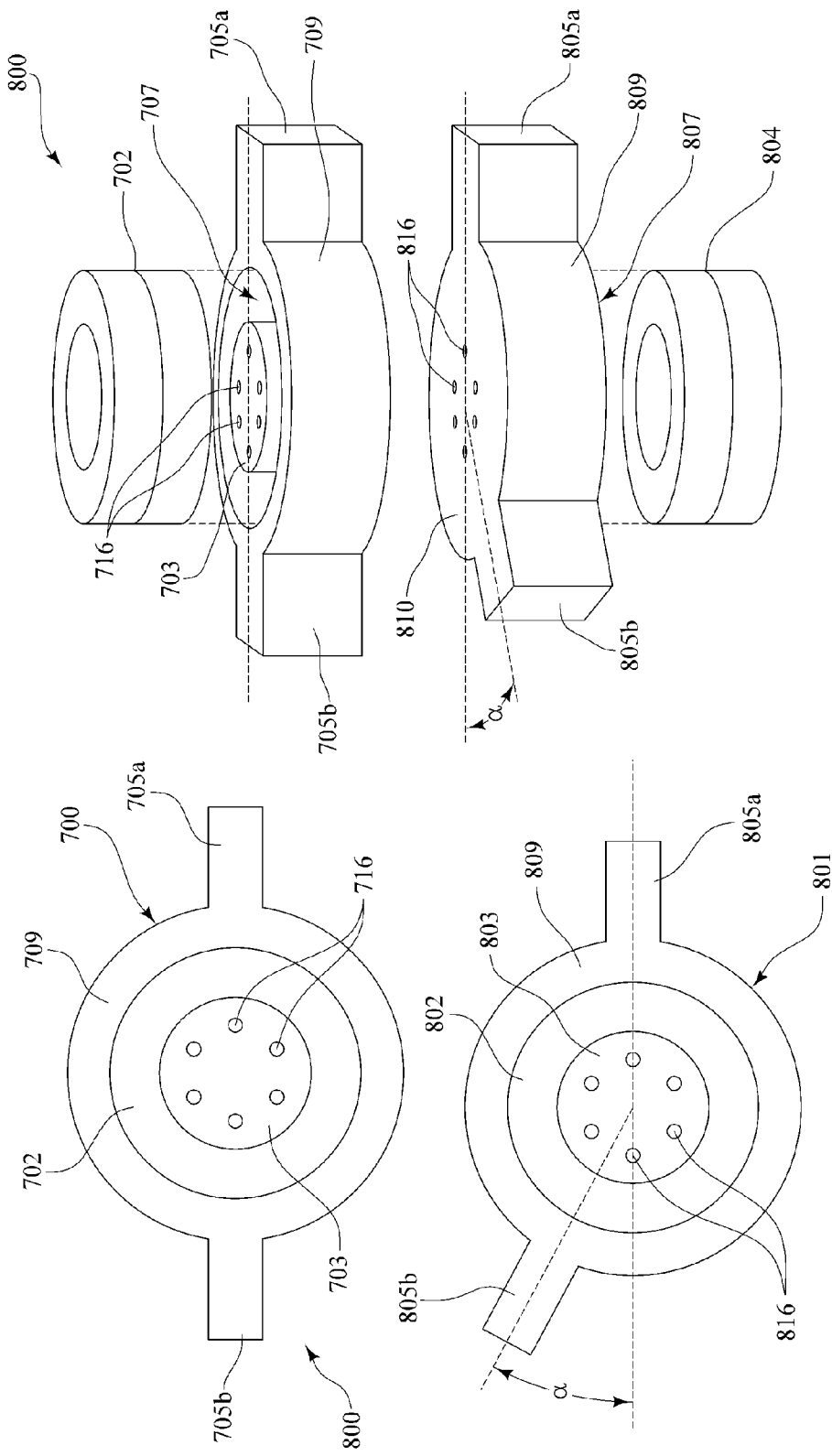

MAGNETIC CONNECTORS FOR MICROFLUIDIC APPLICATIONS

CROSS-REFERENCE TO RELATED APPLICATIONS

This application claims the benefit under 35 U.S.C. §119 (e) of U.S. Provisional Application No. 61/219,556, entitled "MAGNETIC CONNECTORS FOR MICROFLUIDIC APPLICATIONS", filed Jun. 23, 2009, which is hereby incorporated herein by reference in its entirety.

STATEMENT REGARDING FEDERALLY SPONSORED RESEARCH OR DEVELOPMENT

This work is funded in part by the National Institute of Standards and Technology under the U.S. Department of Commerce.

ASSIGNEE: NATIONAL INSTITUTE OF STANDARDS AND TECHNOLOGY

FIELD

Aspects of the present invention generally relate to microfluidic devices and methods, more specifically to connectors for connecting fluid transport devices to inlets and outlets of microfluidic devices or microfluidic chips and microfluidic valved connections.

BACKGROUND

This invention relates to interfacing microfluidic devices to the macro world and more specifically to a method and means for connecting fluid transport devices such as tubing or needles and optionally intermediate devices such as filters to inlets and outlets of microfluidic devices and microfluidic valved connections.

Devices for performing chemical analysis have become miniaturized. For example, microfluidic devices have been constructed using microelectronic fabrication and micromachining techniques on planar microfluidic chips such as glass or silicon which may incorporate a series of interconnected channels or conduits to perform a variety of chemical analysis such as capillary electrophoresis and high-performance liquid chromatography.

Microfluidic chips may have networks of chambers connected by channels which may have a dimension between 0.1 microns and 500 microns, for example. Such microfluidic chips may be fabricated using photolithographic techniques similar to those used in the semi-conductor industry, and the resulting devices may be used to perform a variety of sophisticated chemical and biological analyses. Microfluidic connectors and valves may be used to connect tubing to the microfluidic chips and to introduce and/or withdraw fluids (e.g. liquids and gases) therethrough.

As reflected in the patent literature, methods of making microfluidic connectors include placing tubing directly on a microfluidic chip surface and pouring epoxy around the tubing to permanently maintain a connection between the tubing and the microfluidic chip. A commonly used connector is an "Upchurch Connector", manufactured by Upchurch® Scientific, acquired by the IDEX Corporation of Oak Harbor, Wash. Upchurch® connectors are plastic connectors with a ring of a polymer or adhesive material, such as epoxy, that are pressed on the microfluidic chip and heated to create a permanent bond. Typically, it is necessary to glue the Upchurch® connectors to the wafers or microfluidic chips with a special epoxy.

However, adhesive bonding may be difficult and may be unsuitable for many chemical analysis applications since solvents in a sample solution may attack the adhesive which may clog the microfluidic channels. Degradation of the adhesive may also cause the connector to leak or even detach from the microfluidic chip. Additionally, the adhesive may contaminate the sample delivered to an analytical device. Furthermore, adhesive bonding results in a permanent attachment of the tubing to the microfluidic device which makes it difficult to change components such as microfluidic devices or tubing. Once the permanent connector fails, the microfluidic device may be useless. Thus assembly, repair, and maintenance of such devices may be costly and labor and time intensive.

To avoid problems associated with adhesive bonding, other techniques have been employed, such as press fitting the tubing into a port on a microfluidic device or microfluidic chip. For example, in "A rapid, reliable, and automatable lab-on-a-chip interface", by Kortmann H, Blank L M, Schmid A, Lab on a chip, 2009 May 9(10):1455-60, a new type of press-fit connector was introduced that incorporate springs to produce the mounting force with leak-free operation. In this approach, each connector is pressed independently against a back plate to ensure proper sealing of multiple connectors. The press-fit connectors have some advantages over the Upchurch® connectors, such as reliability, reusability and fast assembly. However, some drawbacks may be (i) high cost, (ii) high complexity as each connector may require a large number of parts, and (iii) the platform and the connectors may be required to be mounted on a fixed geometry with limited flexibility. Additionally, connections made by pressing the tubing onto a microfluidic chip may create stress loads on the microfluidic chip which may cause fractures of the channels and/or microfluidic chip.

More recently, tubes have been connected with magnetic connectors. For example, in U.S. Patent Publication 2008/0143098, invented by Zimmermann et al., entitled "Magnetic Fluid Coupling Assemblies and Methods", an apparatus for magnetically connecting tubing is disclosed. A pair of magnets are configured to attract one another wherein both magnets have a sole tube extending there from. Each magnet has a flow through orifice configured and disposed to be in flow communication upon connecting the two magnets with one another. However, Zimmermann et al. fail to provide an apparatus for connecting microfluidic transport devices to a microfluidic chip and adjustable magnetic valve connections.

Valved connections for microfluidic devices are also disclosed in the patent literature. For example, in U.S. Pat. No. 6,910,503, invented by Schick et al., entitled "Methods and Apparatus for Micro-Fluidic Analytical Chemistry", an apparatus for connecting tubing, in a microfluidic device, with a valve disposed in the connector is disclosed. The valve disclosed in Schick et al. comprises at least two parts with at least one through orifice in each part. In a first connecting orientation between the at least two parts, at least one through orifice in one of the parts is in flow communication with a through orifice in another part. In a second orientation between the at least two parts, flow communication between the through orifices of the two parts is altered. However, Schick et al. fail to provide a valve configured to connect tubing to a microfluidic chip and a changeable or quick release valve.

What is needed are improved microfluidic connectors and valves which overcome some of the shortcomings, disadvantages, and limitations of the connectors and valves disclosed in the patent literature.

SUMMARY

According to one aspect of the present invention, a magnetic connector assembly for microfluidic devices is provided. The magnetic connector assembly comprises a first magnetic connector comprising a first side surface and a second side surface; an orifice extending from the first side surface to the second side surface of the first magnetic connector; a microfluidic chip comprising a first side surface and a second side surface; an orifice in the first side surface of the microfluidic chip; a micro-channel in the microfluidic chip in flow communication with the orifice in the first side surface of the microfluidic chip; a second magnetic connector configured to magnetically engage the first magnetic connector with the microfluidic chip disposed therebetween; one of the first magnetic connector and the second magnetic connector comprises at least one of a permanent magnet and an electromagnet and the other of the first magnetic connector and the second magnetic connector comprises at least one of a ferromagnetic material, a permanent magnet, and an electromagnet; a seal configured and disposed to seal the first side surface of the first magnetic connector to the first side surface of the microfluidic chip upon the first magnetic connector being placed on the first side surface of the microfluidic chip and the second magnetic connector being placed on the second side surface of the microfluidic chip wherein the second magnetic connector is disposed to magnetically engage the first magnetic connector; the orifice extending from the first side surface to the second side surface of the first magnetic connector being configured to sealingly cooperate with a fluid transport device, e.g. tube or needle, at its opening in the second side surface, the fluid transport device is configured to provide fluid flow into or out of the orifice and the micro-channel, in the microfluidic chip, and through the orifice in the first magnetic connector; the first magnetic connector and the second magnetic connector being axially polarized and configured to provide an attracting force therebetween throughout a full 360° rotation of the first magnetic connector with respect to the second magnetic connector; the first and the second magnetic connectors being configured to provide a magnetic force therebetween sufficient for sealing the first side surface of the first magnetic connector with the first side surface of the microfluidic chip, with the seal therebetween; the first and the second magnetic connectors being configured to provide a magnetic force therebetween wherein the first magnetic connector is releasable from first side surface of the microfluidic chip upon a force being applied by hand to the first or second magnetic connector.

In another aspect of the present invention, a connector assembly for microfluidic devices is provided wherein the connector assembly comprises a first connector comprising a first side surface and a second side surface; a second connector configured to magnetically engage the first connector with a microfluidic chip therebetween; the first side surface of the first connector being configured to sealingly engage a first side surface of the microfluidic chip upon the first and second connectors being placed on opposing sides of the microfluidic chip and disposed to magnetically engage each other; at least one orifice extending from the first side surface to the second side surface of the first connector being configured to be disposed in flow communication with at least one orifice in the first side surface of the microfluidic chip; and the first and the second connectors being configured to provide an attracting magnetic force therebetween greater than a separating force caused by a fluid pressure in the at least one orifice in the first connector or in the at least one orifice in the microfluidic chip.

In yet another aspect of the present invention, a valve assembly for microfluidic devices is disclosed. The valve assembly comprises a first connector comprising a first side surface and a second side surface. The first connector comprises a first orifice extending from an off center portion of the first side surface to the second side surface of the first connector. The first orifice of the first connector is configured to sealingly cooperate with a fluid transport device at its opening in the second side surface. A second connector comprises a first side surface and a second side surface and a first orifice extending from an off center portion of the first side surface to the second side surface of the second connector. The first orifice of the second connector is configured to sealingly cooperate with a fluid transport device at its opening in the second side surface. The first connector is configured to magnetically engage the second connector and to rotatingly seal the first side surface of the first connector to the first side surface of the second connector upon magnetic engagement of the first connector with the second connector. The first orifice of the first connector is disposed to be in flow communication with the first orifice of the second connector upon the first connector being in a first rotational position with respect to the second connector. The first orifice of the first connector is disposed to not be in flow communication with the first orifice of the second connector upon the first connector being in a second rotational position with respect to the second connector. The first and the second connectors are configured to provide a magnetic force therebetween sufficient to form a seal between the first side surface of the first connector and the first side surface of the second connector. The first and the second connectors are configured to provide a magnetic force therebetween wherein the first connector is releasable from the second connector upon an axial or rotational force being applied by hand to the first or the second connector.

These and other features, aspects and advantages of the present invention will become better understood with reference to the following drawings, description and claims.

BRIEF DESCRIPTIONS OF THE DRAWINGS

The following figures, which may be idealized, may not to scale and are intended to be merely illustrative and non-limiting.

Figure 8C:
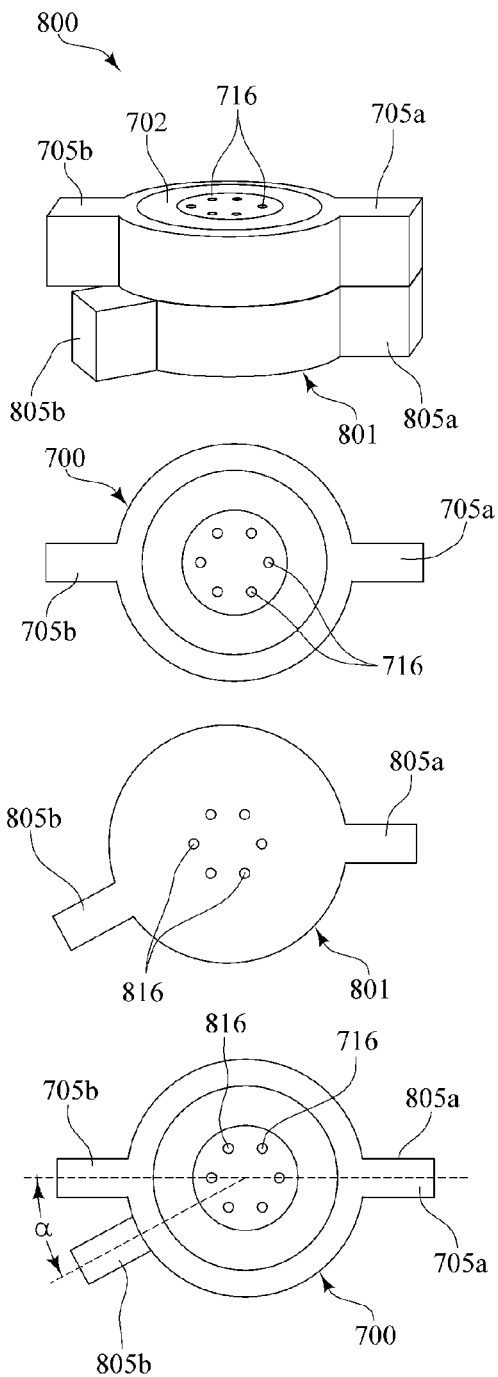
Figure 8D:
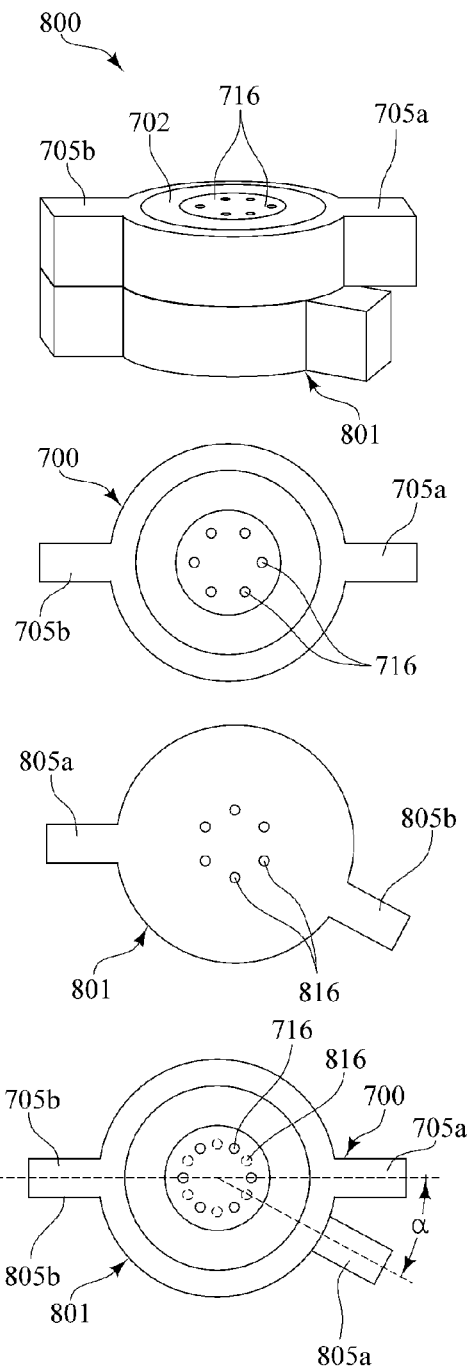
Figure 9:
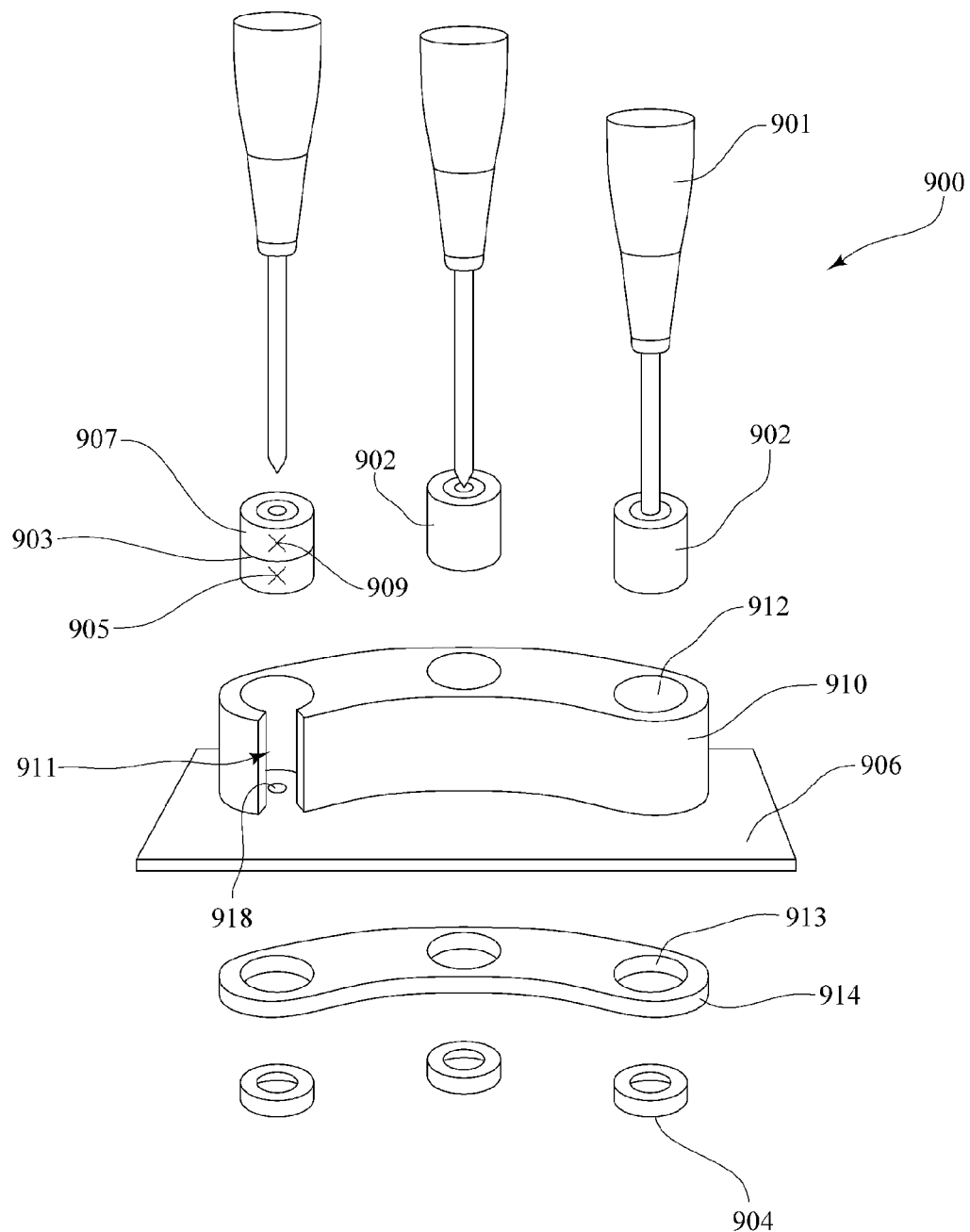

FIGS. 8A, 8B, 8C, and 8D show a magnetic connector assembly with a plurality of valve openings configured and disposed to provide valved flow communication therethrough; and FIG. 9 shows a magnetic connector assembly having a first magnetic connector aligner and a second magnetic connector aligner.

DETAILED DESCRIPTION

A detailed description will now be provided. Each of the appended claims is to be recognized as including equivalents to the various elements or limitations specified in the claims. Depending on the context, all references below to the "invention" or disclosure may in some cases refer to certain specific aspects only. In other cases it will be recognized that references to the "invention" will refer to subject matter recited in one or more, but not necessarily all, of the claims. Each of the inventions is described in greater detail below, including specific aspects, versions and examples, but the disclosure is not limited to these aspects, versions or examples, which are included to enable a person having ordinary skill in the art to make and use the inventions when the information in this patent is combined with available information and technology.

Various terms as used herein. To the extent a term used in a claim is not defined herein, it should be given the broadest definition persons in the pertinent art have given that term as reflected in printed publications and issued patents at the time of filing. Additionally, unless otherwise specified, all compounds or examples described herein may be substituted or unsubstituted and the listing of compounds or examples includes derivatives thereof. Further, various ranges and/or numerical limitations may be expressly stated below. It should be recognized that unless stated otherwise, it is intended that endpoints are to be interchangeable and any ranges shall include iterative ranges falling within the expressly stated ranges or limitations.

Aspects of the microfluidic connectors disclosed herein are based on magnetic force to provide a magnetic force for connecting or bonding tubing to a microfluidic chip and/or to provide a magnetic valve. Magnetic connectors may be configured to reversibly connect or bond tubing to a microfluidic chip or valve connect tubing to a microfluidic chip or other tubing. In one aspect, two magnets or magnetic connectors are used to reversely seal tubing to an inlet or outlet on a microfluidic chip. Aspects of the microfluidic connector comprise a ring magnetic connector on one side a microfluidic chip and a disc magnetic connector on the other side to produce a sealed connection between external tubing and inlets or outlets of microfluidic devices. The connector assembly may be used for microfluidic applications and potentially for macro scale plumbing.

An apparatus for connecting tubing to a microfluidic chip and a microfluidic valve is disclosed herein. In at least one embodiment, microfluidic tubing may be connected to other tubing with the microfluidic valve disclosed herein. Aspects of the present disclosure comprise at least one pair of magnetic connectors configured to attract one another wherein at least one magnetic connector has a fluid transport device such as a tube, needle, or other means for providing fluid flow communication with the microfluidic chip. Fluid, as used herein, means a gas, liquid, or other flow able material. An aspect of a connector assembly for microfluidic devices is configured to be disposed with a microfluidic chip between magnetic connectors and one magnetic connector may have an opening or orifice in flow communication with an orifice in the microfluidic chip and a fluid transport device.

An aspect of a microfluidic valve comprises at least two magnetic connectors with at least one orifice in each magnetic connector. In a first connecting orientation between the at least two magnetic connectors, at least one orifice in one of the magnetic connectors is configured to be in flow communication with an orifice in another magnetic connector. In a second orientation between the at least two magnetic connectors, either flow communication between the orifices in the magnetic connectors is blocked or flow communication is established between different orifices.

The present disclosure discloses aspects of a magnetic connector assembly configured to connect tubing, needle, or other fluid transport device configured to provide fluid flow communication to a microfluidic chip and a magnetic connector assembly configured to provide a microfluidic valve for attaching microfluidic tubing to a microfluidic chip or other microfluidic tubing.

In at least one aspect, two magnetic connectors are provided. A first magnetic connector is configured to be placed on a surface of a microfluidic chip and has an orifice extending therethrough to provide flow through passage of a fluid. The first magnetic connector may have a gasket disposed thereon configured to form a seal about an inlet or outlet in the microfluidic chip and an orifice opening in the first magnetic connector. The other orifice opening in the first magnetic connector may be configured to seal a fluid transport device such as tubing or a needle therewith. A second magnetic connector is configured to be disposed on a side of the microfluidic chip opposite the inlet or outlet in the microfluidic chip and removably seal the first magnetic connector about the inlet or outlet in the microfluidic chip. The magnetic connectors may be low-cost, simple to use and useful with many microfluidic devices and may provide an effective, high pressure, low fluid dead volume seal. The microfluidic connectors may be easy to assemble and may be reusable.

Figure 1:
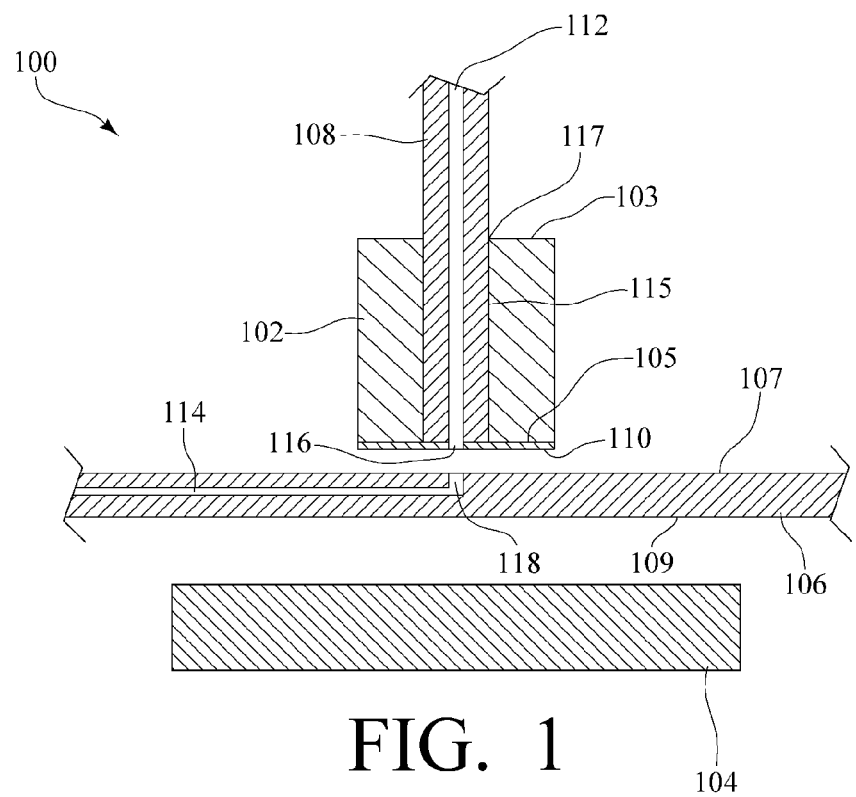
FIG. 1 is a cross-sectional view of a magnetic connector assembly for microfluidic devices showing component parts of the magnetic connector assembly and cutaway portion of a microfluidic chip.
Figure 2:
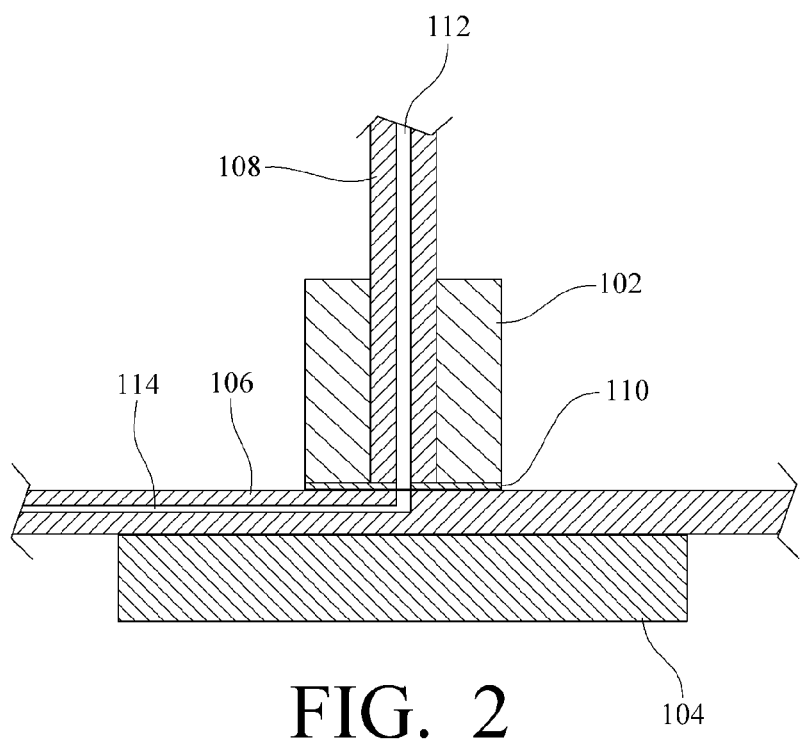
FIG. 2 is a cross-sectional view of the magnetic connector assembly of FIG. 1 showing the magnetic connector assembly operably engaged with a microfluidic chip.

Turning to the figures, FIGS. 1 and 2 show a magnetic connector assembly 100 for microfluidic devices wherein magnetic connector assembly 100 is removed from and operably engaged with microfluidic chip 106. A first magnetic connector 102 may be ringed shaped or have a cylindrical shape as shown. Fluid transport device 108 may be introduced into orifice opening 117 of orifice 115 in first magnetic connector 102 or otherwise disposed in flow communication with orifice 115. Fluid transport device 108 may be any device configured to transport fluids, such as tubing or a needle. In an aspect where fluid transport device 108 is tubing, it may be bonded to the magnetic connector 102 using an adhesive, for example epoxy.

Figure 4:
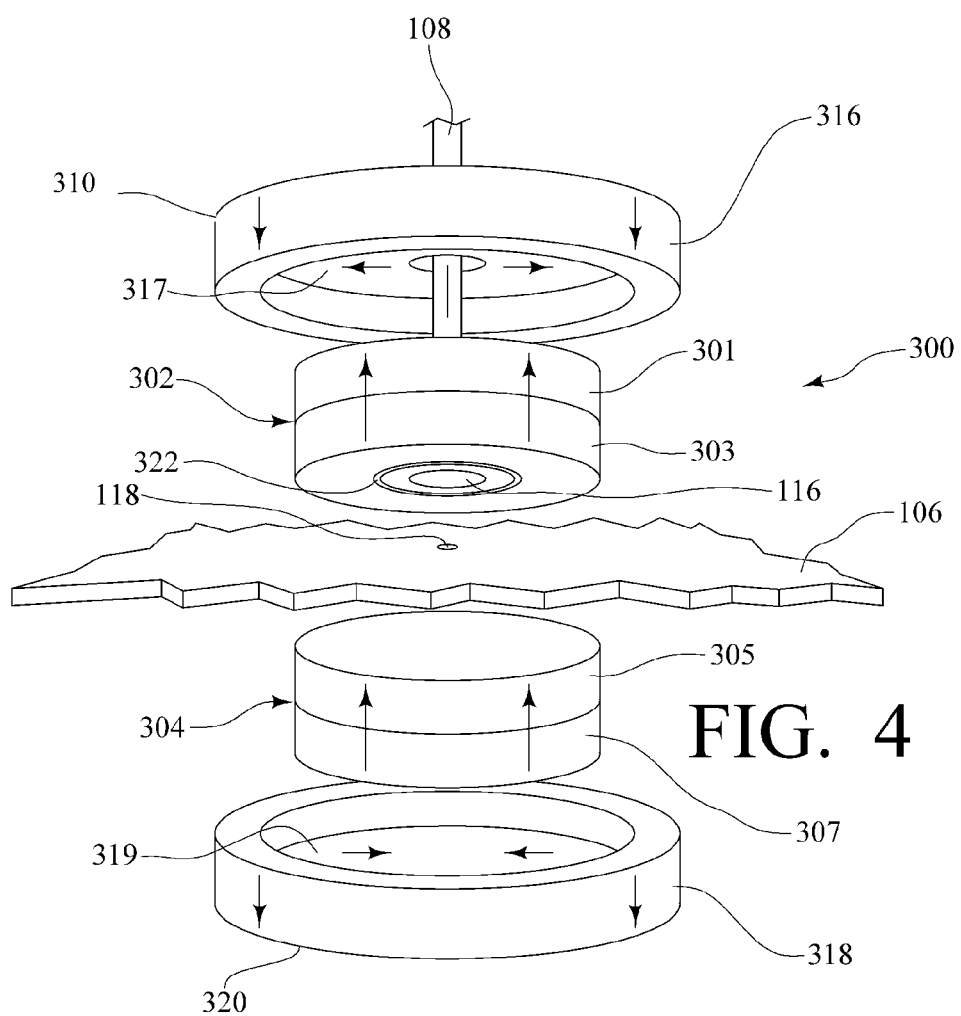
FIG. 4 is an exploded view of a magnetic connector assembly for microfluidic devices showing component parts of a magnetic connector assembly having ferromagnetic cups.

The first magnetic connector 102 may have a gasket or seal 110, for example polyamide tape or a thin membrane of PDMS (Polydimethylsiloxane), or double-sided polyester tape with acrylic adhesive such as 3M™ of St. Paul, Minn., part #444, or double-sided polyimide tape with silicone adhesive (Argon Inc., part #s PC500-1000), may be adhered on first side surface 105 about orifice opening 116. It is important to note that other materials may be used as a gasket or seal, for example an o-ring may be used. An O-ring such as a McMaster Carr of Robbinsville, N.J., part# 9452K11, may be used as sealing gasket. To seat the O-ring on one side of the magnetic connector, an annular groove may be machined therein with a ball-end mill, for example. In at least one aspect, first side surface 105 has a groove about orifice opening 116 configured to hold a portion of an o-ring seal, as shown in FIG. 4.

The first magnetic connector 102 is placed on a first surface 107 of microfluidic chip 106 with first orifice opening 116 of first magnetic connector 102 aligned with the inlet or outlet 118 of microfluidic chip 106.

A second magnetic connector 104 is placed on the other side of microfluidic chip 106, opposite inlet or outlet 118, to provide a force that tends to bring first magnetic connector 102 and second magnetic connector 104 together, sandwiching microfluidic chip 106 therebetween and providing a force that seals or compresses seal 110 against microfluidic chip 106. When a flow able material or fluid, e.g. gas or liquid, is introduced through transport device 108 it flows through orifice 115, in magnetic connector 102, and into the micro channel 114 without substantial leakage. A fluid pressure of 0.1, or more, in 0.1 psig increments, up to 100 psig, and greater, may be sealed within microfluidic assembly 100 with little or no leakage.

Transport device 108 may be in the form of plastic or polymeric tubing or may be comprised of metal, such as a metal needle, or tubing. For example, a blunt needle may be inserted and sealed in orifice 115 of magnetic connector 102 with epoxy. Alternatively, one terminus of clear flexible tubing, such as Tygon® part # S-54-HL, may be inserted through the magnet's central orifice 115 until flush with the bottom contact surface 105 of magnetic connector 102 and glued proximate the top of magnetic connector 102. Transport device 108 may also comprise other intermediate devices such as a filter.

Magnetic connectors 102 and 104 have a magnetic force therebetween and may be comprised of permanent magnets, a permanent magnet and a ferromagnetic piece, an electromagnet and a permanent magnet, or an electromagnet and a ferromagnetic piece. First and/or second connectors 102 and 104 may have a plastic covering about their outer surfaces. In at least one embodiment connectors 102 and 104 have a plastic covering about their outer surfaces which do not cooperate with microfluidic chip 106. Microfluidic chip 106 may be comprised of glass or another microfluidic chip material such as quartz, silicon, plastic etc. or even soft polymers (i.e. PDMS), for example, and may be simple to fabricate, easy to assemble, low-cost, and reusable.

Magnetic connector assembly 100 provides a means for connecting fluid transport device 108 to inlet or an outlet 118 of a microfluidic chip 106. Connector assembly 100 is configured for microfluidic devices and comprises a first connector 102 comprising a first side surface 105 and a second side surface 103 with an orifice 115 extending from first side surface 105 to second side surface 103. A second connector 104 is configured to magnetically engage first connector 102. One of first connector 102 and second connector 104 comprises at least one of an electromagnet and a permanent magnet and the other of first connector 102 and second connector 104 comprises at least one of a ferromagnetic material, electromagnet, and permanent magnet.

A seal or gasket 110 may be configured and disposed to seal first side surface 105 of first connector 102 to first side surface 107 of microfluidic chip 106 upon first connector 102 being placed on first side surface 107 of microfluidic chip 106 and second connector 104 being placed on second side surface 109 of microfluidic chip 106 and disposed to magnetically engage first connector 102, as shown in FIG. 2. Orifice 115 extends from first side surface 105 to second side surface 103 and is configured to sealingly cooperate with a transport device 108, such as a tube or needle, proximate or between orifice openings 117 and 116. Tube or needle 108 has an orifice 112 and is configured to provide fluid flow into or out of an orifice 118 in microfluidic chip 106 through orifice 115 in first connector 102. First connector 102 and second connector 104 may be axially magnetically polarized and may be configured to provide an attracting force therebetween throughout a full 360° rotation of first connector 102 with respect to second connector 104.

First and second connectors 102 and 104 are configured to provide a magnetic force therebetween sufficient to seal first side surface 105 of first connector 102 with first side surface 107 of microfluidic chip 106, with seal 110 therebetween. Seal 110 may be configured to seal a fluid at a pressure of at least 0.1 psig, 2 psig, 100 psig, or greater, in 0.1 psig increments. First and second connectors 102 and 104 are configured to provide a magnetic force therebetween wherein first connector 102 is releasable from first side surface 107 of microfluidic chip 106 upon an axial or radial force being applied by hand to first connector 102.

Magnetic connectors 102 and 104 may comprise a variety of one or more magnets or ferromagnetic materials. For example, one or both connectors 102 and 104 may comprise one or more ring or disc magnets such as NdFeB and neodymium magnets. For example, one or more magnets manufactured by Amazing Magnets of Irivne, Calif., part # TJ250B, and K&J Magnetics of Jamison, Pa., part #s R412, D42-N52, D84, may be used. NdFeB magnets may be coated with a metal or resin to prevent exposure of the material to oxygen thus inhibiting oxidation of the magnets. Samarium Cobalt Magnets (SmCo) may also be used. Two or more magnets may be stacked to form first connector 102 and/or second connector 104. Each connector 102 and 104 may have a total axial height of about 1 mm to about 10 mm, in one mm increments. Connectors 102 and 104 may have a total axial height greater than 10 mm.

The pressure of the fluid at inlet or outlet 118 in microfluidic chip 106 that may be sealed with magnetic connectors 102 and 104 depends upon a variety of factors. For example, magnetic connectors 102 and 104 having a larger mass and/or magnetic attraction may provide a seal with a higher fluid pressure. The mass of each magnetic connector 102 and 104 may be proportional to its density and volume. The volume may be proportional to a radius and height, in an aspect where magnetic connectors 102 and 104 are circular or cylindrical, or length, width, and height, in an aspect where magnetic connectors 102 are rectangular. The volume of magnetic connector 102 is inversely proportional to the volume of orifice 115. Therefore, a variety of materials, shapes, and dimensions of magnetic connectors 102 and 104 may be provided to impart a desired magnetic force between magnetic connectors 102 and 104.

Additionally, seals or gaskets 110 having greater sealing properties may provide a seal with a higher fluid pressure. Conversely, a larger distance between first side surface 107 and second side surface 109, of microfluidic chip 106, may decrease a maximum fluid pressure sealed with magnetic connectors 102 and 104.

Figure 3:
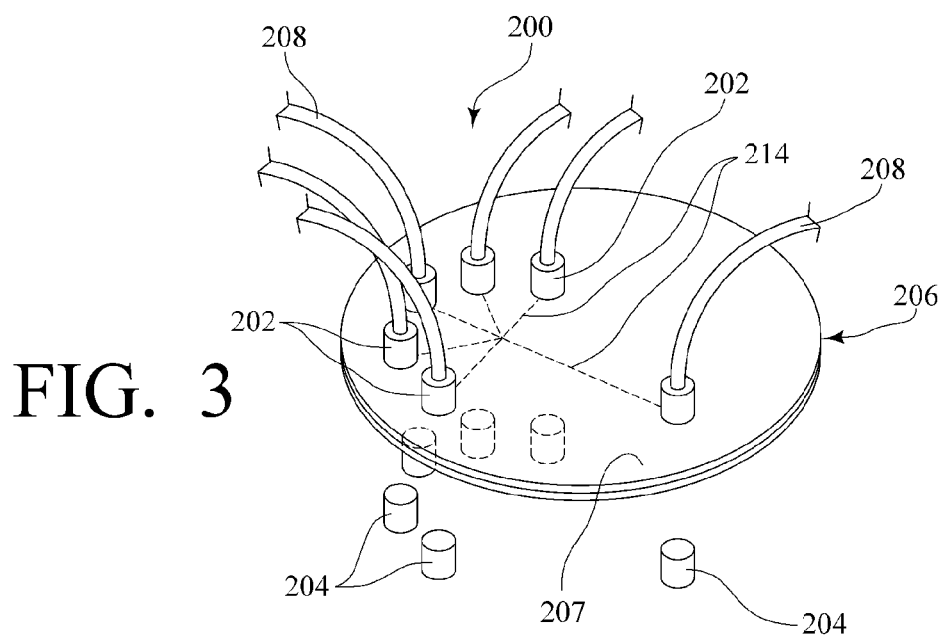
FIG. 3 is a perspective view of a microfluidic chip having a plurality inlets and outlets wherein each inlet and outlet has a magnetic connector assembly associated therewith.

FIG. 3 shows connector assembly 200 comprising a plurality of first magnetic connectors 202 and a plurality of second connectors 204. Each first magnetic connector 202 has a second connector 204 associated therewith to provide a pair of operable magnetic connectors. Each first connector 202 has a fluid transfer device 208, in the form of a tube in this aspect, in flow communication with a central orifice in each first magnetic connector 202. Microfluidic chip 206 has a plurality of interconnected micro channels 214. Each micro channel 214 has an inlet or outlet in surface 207 of microfluidic chip 206. Each micro channel 214 inlet or outlet has a first magnetic connector 202 disposed thereabout. Each second magnetic connector is configured to be disposed adjacent microfluidic chip 206, opposite each micro channel 214 inlet or outlet. Each micro channel 214, in this aspect shown, is in flow communication with one another. However, it is to be understood that aspects of the present disclosure include micro channels 214 that may not all be in flow communication with one another. In at least one aspect of the present disclosure, one first magnetic connector 202 is about an outlet in microfluidic chip 206 and each other first magnetic connector is about an inlet in microfluidic chip 206. For example, microfluidic chip 206 may have five inlets and one outlet; all linked to tubing 208 via the magnetic connectors 204 and 202.

FIG. 4 is an exploded view of a magnetic connector assembly 300 having ferromagnetic cups 310 and 320. Ferromagnetic cups 310 and 320 may aid to cage the magnetic fields and confine the magnetic fields passing through microfluidic chip 106 proximate microfluidic chip inlet or outlet 118. Ferromagnetic cups 310 and 320 may be configured to confine a magnetic field and increase a magnetic flux density of the magnets. This may enable placement of an operable pair of magnetic connectors comprising a first magnetic connector 302 and second magnetic connector 304 in closer proximity to another operable pair of magnetic connectors without collapsing, as may be advantageous in connecting fluid transport devices 208 to microfluidic chip 206, shown in FIG. 3. Using a ferromagnetic caps or cups 310 and 320 around the magnetic connectors 302 and 304 may decrease any air gap therebetween, allowing them to be disposed in closer proximity to one another, and may increase the force between magnetic connectors 302 and 304. This characteristic may be exemplified in aspects of the present disclosure where magnetic connectors 302 and 304 have a larger axial height.

As shown in FIG. 4, the magnetic field through cups 310 and 320 and magnetic connectors 302 and 304 may follow a steroidal path. A magnetic field path is shown with arrows on the component parts. A magnetic field may extend radially in end wall 317 of cup 310 and then may proceed in sidewall 316 toward microfluidic chip 106. The magnetic field may extend into sidewall 318 and radially in end wall 319 of cup 320. The magnetic field may then extend axially through magnetic connector 304 and through microfluidic chip 106. The magnetic field may then extend axially through magnetic connector 302 and back to cup 310. It is to be understood that a portion of the magnetic field may extend beyond cups 310 and 320.

In this aspect of magnetic connector 304, two disc magnets 305 and 307 are stacked such that they attract one another. Magnetic connector 302 has two disc magnets 301 and 303 stacked such that they attract one another. Magnet 303 has O-ring 322 mounted in a concentric trough configured and disposed to seal magnet 303 with microfluidic chip 106, about inlet or outlet port 118.

Connector assembly 300 comprises an axially polarized first magnetic connector 302 and an axially polarized second magnetic connector 304. A first ferromagnetic cup 310 is disposed about first magnetic connector 302 and has an axial polarity imparted thereto opposite the axial polarity of first magnetic connector 302. A second ferromagnetic cup 320 is disposed about second magnetic connector 304 and has an axial polarity imparted thereto opposite the axial polarity of second magnetic connector 304. Magnetic connectors 302 and 304 are configured to provide an attracting force therebetween throughout a full 360° rotation of first magnetic connector 302 with respect to said second magnetic connector 304.

Figure 5A:
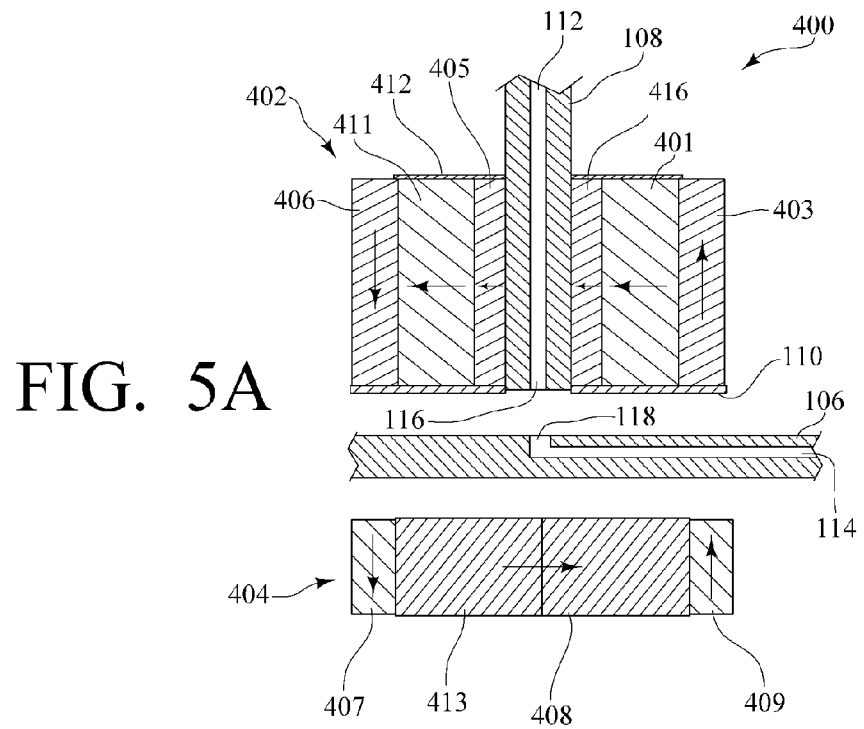
FIG. 5A is a cross-sectional view of a magnetic connector assembly for microfluidic devices showing component parts of a magnetic connector assembly having diametrically magnetized magnets.
Figure 5B:
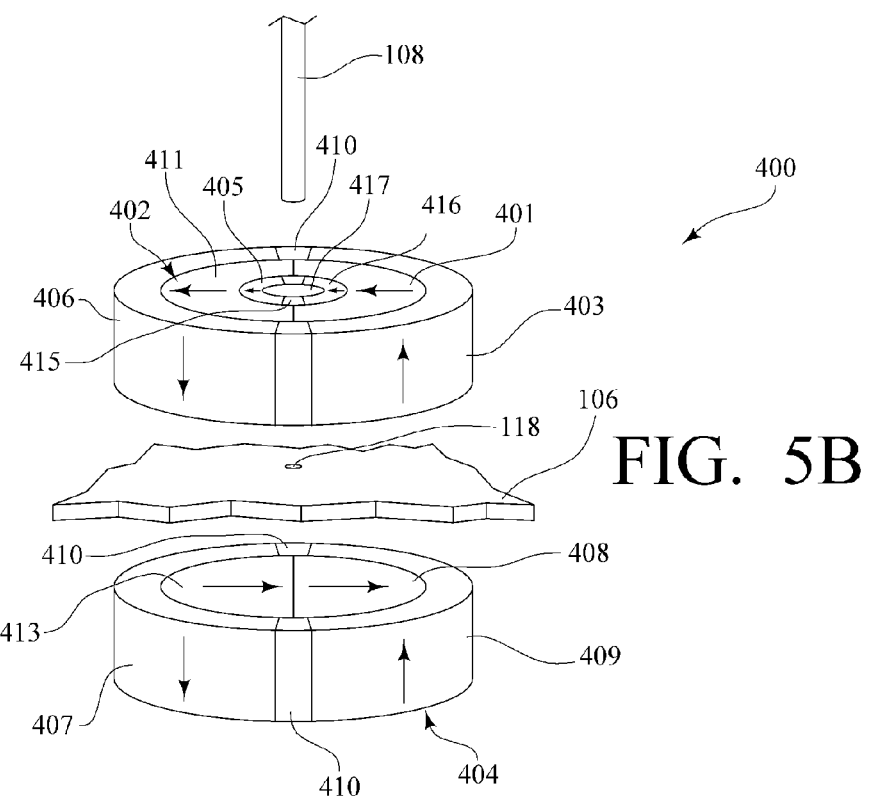
FIG. 5B is a perspective exploded view of a magnetic connector assembly of FIG. 5A having a top cover removed showing magnetic forces.

FIG. 5A shows a cross-sectional view of magnetic connector assembly 400 having diametrically magnetized magnetic connectors and FIG. 5B shows magnetic connector assembly 400 with a top cover 412 removed showing magnetic forces. Top cover 412 may be plastic and may extend about an outer surface of magnetic connector 402. For example, cover 412 may extend about the outer cylindrical surfaces of ferromagnetic cup components 403 and 406. First magnetic connector 402 has a cylindrical diametrically polarized magnetic assembly comprising magnet 401 and magnet 411. Connector component 416 is adjacent magnet 401 and may form a portion of the cylindrical diametrically polarized magnetic assembly with a radial magnetic field. Connector component 405 is adjacent magnet 411 and may form a portion of the cylindrical diametrically polarized magnetic assembly. Connector components 416 and 405 may comprise ferromagnetic or magnetic materials and may have spacers 415 therebetween. Spacers 415 may be comprised of plastic or other nonmagnetic or nonferromagnetic materials or may be void spaces. It is to be understood that the cylindrical diametrically polarized magnetic assembly comprised in first magnetic connector 402 may comprise a sole cylindrical magnet or any number of magnets.

Second magnetic connector 404 comprises a disc shaped diametrically polarized magnet. In the aspect shown, the disc shaped diametrically polarized magnet comprises magnet 413, which has makes up half of the disc shape, and diametrically polarized magnet 408, which makes up the other half of the disc shape. It is to be understood that the disc shaped diametrically polarized magnet of magnetic connector 404 may comprise a sole disc shaped diametrically polarized magnet or more than two magnets to form the disc shape. The diametrically polarized magnets in magnetic connectors 402 and 404 are configured to provide a maximum attracting force therebetween at a first rotational orientation of magnetic connector 402 with respect to magnetic connector 404 and a maximum repelling force therebetween at a second rotational orientation of magnetic connector 402 with respect to magnetic connector 404. Therefore, magnetic connector 402 may be releasable from microfluidic chip 106 upon an axial or rotational force being applied by hand to magnetic connector 402 or 404.

Magnetic connectors 402 and 404 may also comprise ferromagnetic cups configured and disposed to confine a magnetic field and increase a magnetic flux density of magnetic connectors 402 and 404 when they are operably engaged with microfluidic chip 106. For example, magnetic connector 402 may have ferromagnetic cup components 403 and 406 about the magnetic poles of the cylindrical diametrically polarized magnetic assembly, magnets 401 and 411 for example. Ferromagnetic cup components 403 and 406 may have spacers 410 therebetween. Spacers 410 may be comprised of plastic or other nonmagnetic or nonferromagnetic materials or may be void spaces. Magnetic connector 404 may have ferromagnetic cup components 407 and 409 about the magnetic poles of the disc shaped diametrically polarized magnetic assembly, magnets 413 and 408 for example. Axially polarized magnets 401, 411, 413, and 408 and ferromagnetic cup components 403, 406, 407, and 409 may be configured and disposed to establish a circular magnetic field substantially within magnetic connectors 402 and 404 when operably engaged with microfluidic chip 106, as shown in FIGS. 5A and 5B.

Magnetic connector 402 may have a cover 412 about an axial end opposite orifice opening 116. Magnetic connector 402 may also have seal 110 configured and disposed to seal with microfluidic chip 106 upon operably engaging magnetic connector 404 with magnetic connector 402.

Figure 6A:
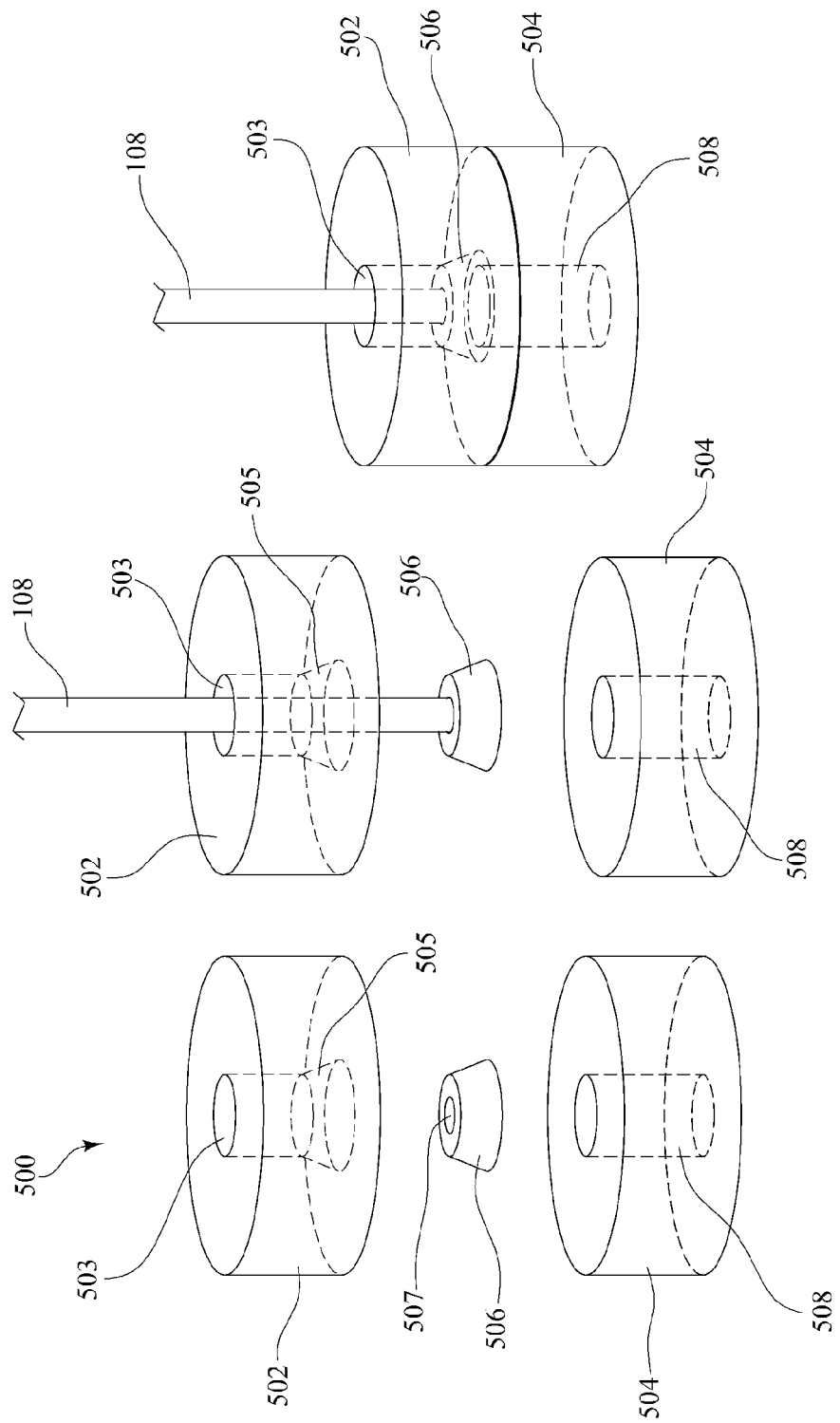
FIG. 6A is a perspective view of a magnetic connector assembly for microfluidic devices showing a tube connector having a ferrule.

FIG. 6A shows magnetic connector assembly 500 for microfluidic devices having a tube 108 connected therewith. In this aspect, tube 108 is sealed within magnetic connector assembly 500 comprising first cylindrical magnet 502 and second cylindrical magnet 504. First cylindrical magnet 502 has a cylindrical orifice 503 extending from an upper surface down to a frustoconical orifice 505. Cylindrical orifice 503 is configured to receive tube 108 and frustoconical orifice 505 is configured to receive a ferrule 506. Ferrule 506 has a central orifice 507 configured to seal with an outer surface of tube 108. Second cylindrical magnet 504 has a central axial orifice 508 disposed to axial align with tube 108 and retain ferrule 506 within frustoconical orifice 505, upon engagement of first cylindrical magnet 502 with second cylindrical magnet 504. Magnetic connector assembly 500 is configured to sealingly cooperate with tube 108 which is configured to provide fluid flow into or out of an orifice in a microfluidic chip.

Figure 6B:
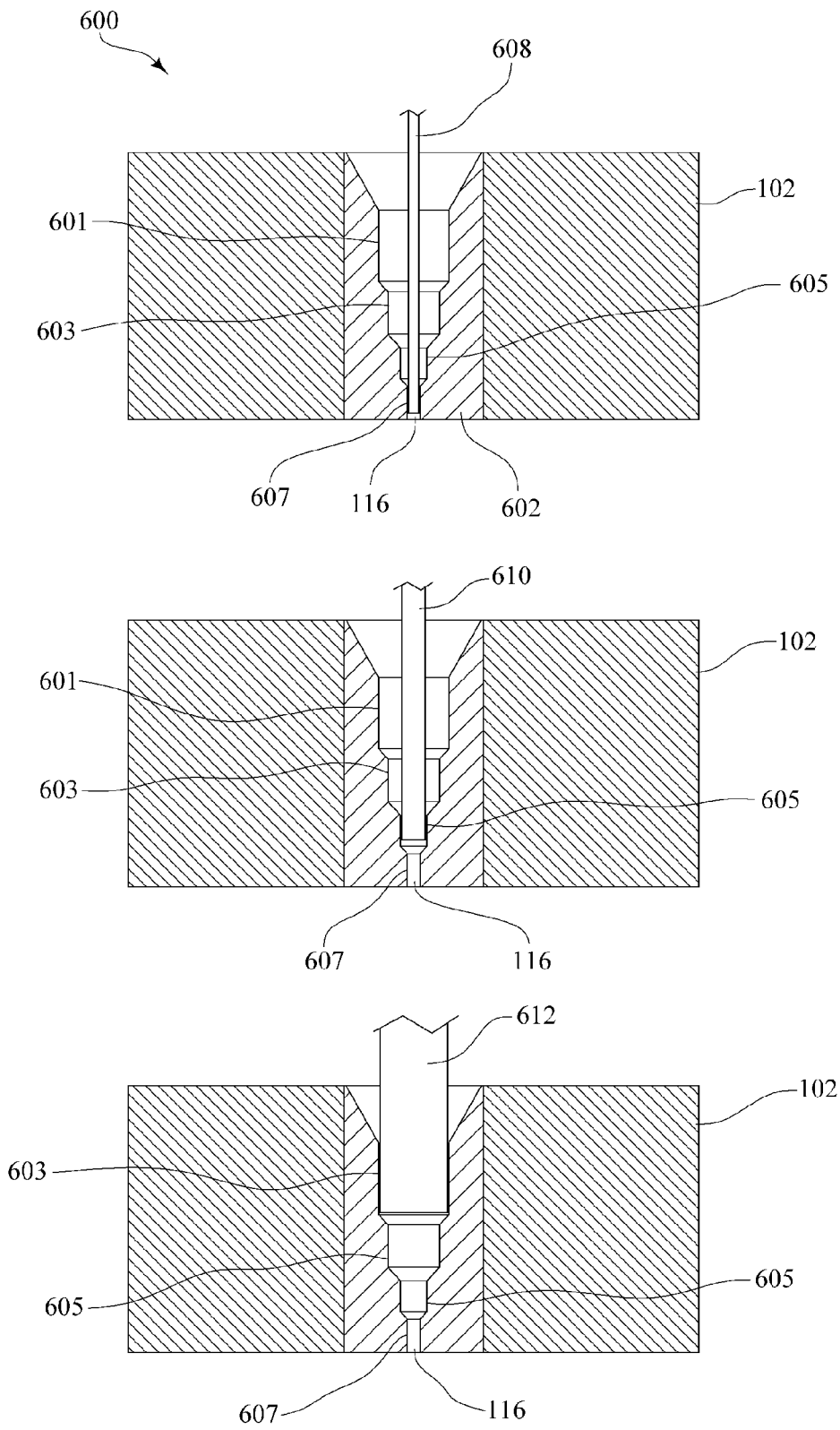
FIG. 6B is a cross-sectional view of a magnetic connector assembly for microfluidic devices showing a tube connector having a plurality of diameters in an orifice in a magnetic connector.

FIG. 6B shows an aspect of a magnetic connector of the present disclosure providing another means for sealing a tube with a magnetic connector. Magnetic connector 600 has cylindrical magnet 102 with tube connector 602 retained within the axial orifice in cylindrical magnet 102. Tube connector 602 may be magnetic or may be polymeric and has a plurality of axially aligned cylindrical orifices with decreasing diameters therein. Each axially aligned cylindrical orifice 601, 603, 605, and 607 is separated from adjacent cylindrical orifice(s) with a frustoconical section 609 configured to guide tube 608, 610, or 612 into a cylindrical orifice configured to sealingly receive the tube. For example, tube 608 may be inserted into tube connector 602 until it is sealingly received within cylindrical orifice 607, proximate orifice opening 116. Likewise, tube 610 is configured to sealingly engage within cylindrical orifice 605 and tube 612 is configured to sealingly engage within cylindrical orifice 603. Adhesives may be used to secure the tube within the cylindrical orifice configured to sealingly engage the tube.

FIGS. 6A and 6B show but a couple examples of means for connecting fluid transport devices to magnetic connectors. Other and different connecting means may be used in the present disclosure. For example, cylindrical magnet 102 may have a fluid transport device connector in the form of a radially inner thread in the axial orifice in cylindrical magnet 102. The thread may be formed within magnet 102 or may be comprised in a polymeric insert within the axial orifice in cylindrical magnet 102. The polymeric insert may be a part of a cover configured to cover outer surfaces of cylindrical magnet 102. Such a configuration may threadingly receive a fluid transport device such as a threaded Upchurch® connector, part # PK-115, or other threaded fluid transport device connector, making the connectors of the present disclosure compatible with portions of connectors or fluid transport device connectors presently in use.

Figure 7:
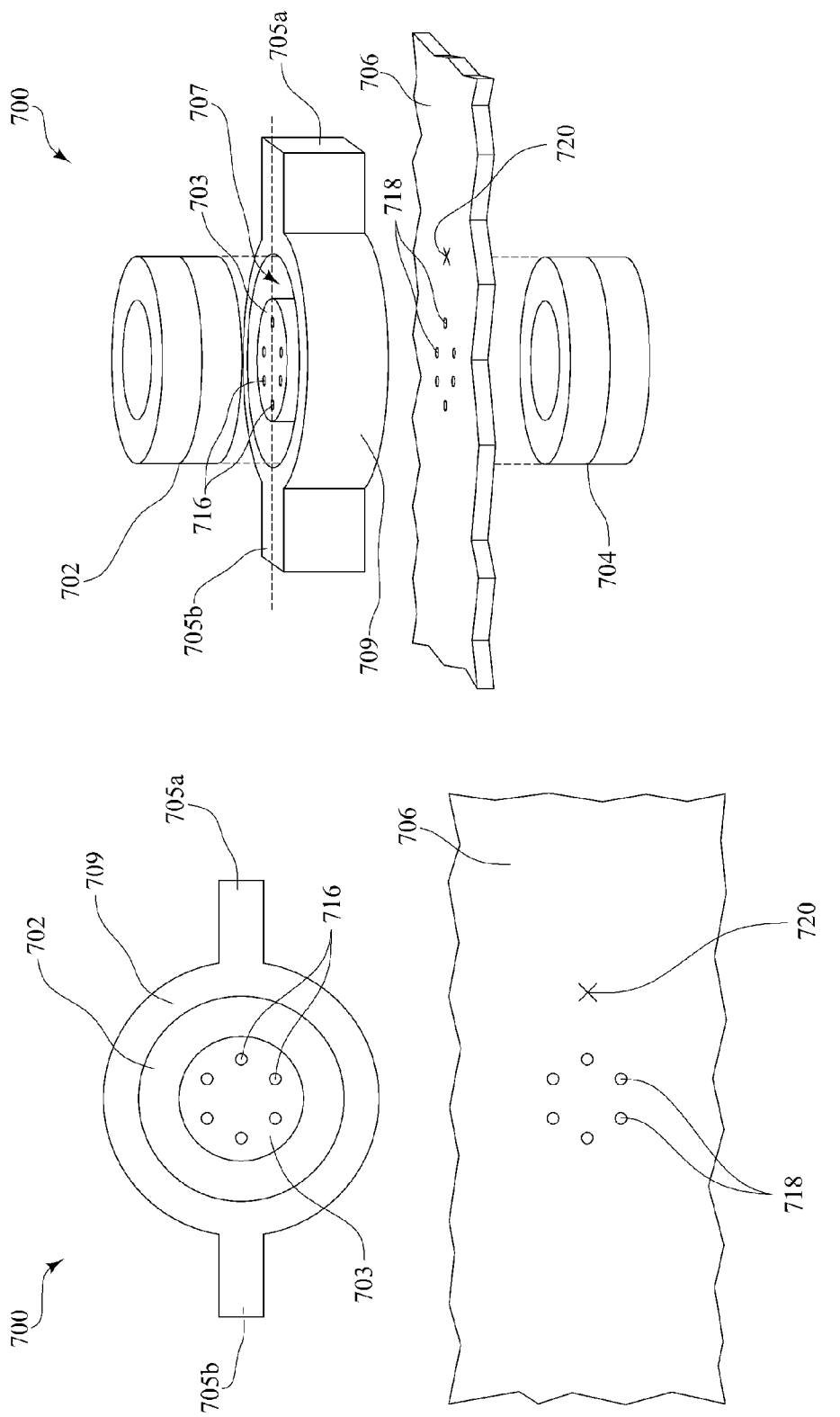
FIG. 7 is a top and exploded view of a magnetic connector assembly with a plurality of valve openings configured and disposed to provide valved flow communication with a microfluidic chip.

FIG. 7 shows a magnetic connector assembly 700 configured to provide a valved connection with microfluidic chip 706. A cage 709 is configured to hold magnet 702 in trough 707 and has a plurality of valve openings 716, in upper surface 703, configured and disposed to provide flow communication with microfluidic chip 706. In this aspect of a magnetic connector assembly, two magnetic connectors 702 and 704 are configured to provide a multi-connector valve. Cage 709 may be comprised of magnetic materials or non-magnetic materials such as plastics or Teflon®, for example. In at least one embodiment, magnet 702 and portions of cage 709 are magnetic and monolithic. Cage 709 has trough orifices or valve openings 716 that may be aligned with orifices 718 in microfluidic chip 706. For example, rotation of cage 709 on microfluidic chip 706 to position wherein alignment feature or tab 705a covers mark 720, on microfluidic chip 706, provides a first flow communication between each valve opening 716 and an orifice 718 in microfluidic chip 706. Rotation of cage 709 on microfluidic chip 706 to position wherein alignment feature or tab 705b covers mark 720, on microfluidic chip 706, provides a second flow communication between each valve opening 716 and an orifice 718 in microfluidic chip 706. Rotation of cage 709 on microfluidic chip 706 to a position wherein tab 705a or 705b is proximate mark 720 causes valve openings 716 to be misaligned with orifices 718, stopping flow communication between valve openings 716 and microfluidic chip 706. In this aspect of the microfluidic connectors, a plurality of different flow communications may be established with the rotation of cage 709 on microfluidic chip 706. Such an aspect may be used to provide injection ports for chromatography, for example.

Other and different alignment features may be used in the present disclosure. For example, the outer surface of magnet 702 or optional cage 709 may have a shape such as triangular or hexagonal, one or more indentions, extensions, markings, etchings, or other configurations that enable desired placement and rotational configuration of valve openings 716 with respect to orifices 718.

Connector assembly 700 has at least one valve opening or orifice 716 extending from a first side surface to a second side surface which are disposed to become in flow communication with at least one orifice 718 in microfluidic chip 706 upon cage 709 being in a first rotational position with respect to microfluidic chip 706. At least one orifice 716 is disposed to not be in flow communication with an orifice 718 or to be in flow communication with a different orifice 718 upon cage 709 being in a second rotational position with respect to microfluidic chip 706. Magnets 704 and 702 may each be comprised of a sole magnet or a plurality of magnets, each configured to provide an attracting magnetic force therebetween greater than a separating force between microfluidic chip 706 and cage 709 upon stopping flow communication between cage 709 and microfluidic chip 706.

FIGS. 8A, 8B, 8C, and 8D show magnetic connector assembly 800 with a plurality of valve openings 716 and 816 configured and disposed to provide valved flow communication therethrough. In this aspect of the magnetic connector assembly, two magnetic connectors 700 and 801 are configured to provide a multi-connector valve configured to provide flow communication through transport devices such as needles and tubes and orifices 716 and 816.

FIGS. 8A and 8B show the component parts of magnetic connectors 700 and 801. Magnetic connector 700 comprises cage 709 with two radially aligned tabs 705a and 705b. Trough 707 is concentrically centered in a top surface of magnetic connector 700 and is configured to hold magnet 702. Orifices 716 are substantially equally spaced about a central axis of magnetic connector 700 in upper surface 703 of magnetic connector 700. Magnetic connector 801 comprises cage 809 with two radially misaligned tabs 805a and 805b. Tabs 805a and 805b have an angle α therebetween. Trough 807 is concentrically centered in a bottom surface of magnetic connector 801 and is configured to hold magnet 804. Orifices 816 are substantially equally spaced about a central axis of magnetic connector 801 in upper surface 810 of magnetic connector 801. Each magnetic connector 700 and 801 has trough orifices or orifices 716 and 816 that may be aligned and thus, provide flow communication therebetween, or misaligned to stop the flow communication therebetween. Magnetic connector assembly 800 may be used to provide valves configured for injection in chromatography, for example.

FIG. 8C shows magnetic connector assembly 800 having magnetic connectors 700 and 801 aligned to provide flow communication through each orifice 716 and 816. Tabs 705a and 805a are aligned and tabs 705b and 805b are misaligned by angle α. This configuration axially aligns each orifice 716 with an orifice 816, providing flow communication therethrough. FIG. 8D shows magnetic connector assembly 800 having magnetic connectors 700 and 801 aligned to stop flow communication through each orifice 716 and 816. Tabs 705b and 805b are aligned and tabs 705a and 805a are misaligned by angle α. This configuration axially misaligns each orifice 716 with an orifice 816, stopping flow communication therethrough.

Aspects of the present disclosure may include two, three, or more magnetic connectors with a plurality of configurations to provide the alignment and misalignment of orifices in a first connector, second connector, etc. For example, a valve assembly for microfluidic devices comprises a first connector 700 comprising a first side surface, a second side surface, and a first orifice 716 extending from an off center portion of the first side surface to the second side surface of the first connector. The first orifice 716 of the first connector 700 is configured to sealingly cooperate with a tube at its opening in the second side surface. A second connector 801 comprises a first side surface and a second side surface with a first orifice 816 extending from an off center portion of the first side surface to the second side surface of the second connector 801. The first orifice of the second connector is configured to sealingly cooperate with a tube at its opening in the second side surface. The first connector 700 is configured to magnetically engage the second connector 801 and to rotatingly seal the first side surface of first connector 700 to the first side surface of second connector 801 upon magnetic engagement of first connector 700 with second connector 801. The first orifice 716 of first connector 700 is disposed to be in flow communication with first orifice 816 of second connector 801 upon first connector 700 being in a first rotational position with respect to second connector 801, as shown in FIG. 8C. First orifice 716 of first connector 700 is disposed to not be in flow communication with first orifice 816 of second connector 801 upon first connector 700 being in a second rotational position with respect to second connector 801, as shown in FIG. 8D. First and second connectors 700 and 801 may be configured to provide a magnetic force therebetween sufficient to form a seal between the first side surface of first connector 700 and the first side surface of second connector 801 with a fluid pressure of at least 0.1 psig therebetween. First and said second connectors 700 and 801 are configured to provide a magnetic force therebetween wherein first connector 700 is releasable from second connector 801 upon an axial or rotational force being applied by hand to first connector 700 or second connector 801.

Aspects of the present disclosure may be configured to stop or change the fluid flowing through the orifices in the connectors thus providing a means to select a flow configuration by rotating one or more connectors with respect to the other connectors. For example, 3 or more magnetic connectors may be provided enabling a user to dial in a desired flow pattern through each connector.

FIG. 9 shows magnetic connector assembly 900 having a first magnetic connector aligner 910 and a second magnetic connector aligner 914. Magnetic connector aligners 910 and 914 may be comprised of nonmagnetic materials such as plastic and may be configured to aid in maintaining magnetic connectors in place against forces that may be exerted thereon by neighboring magnetic connectors. One or more of the magnetic connectors may provide a valve connection. For example, magnetic connector aligner 910 has 3 orifices, 911 and (2) 912, each configured to receive a magnetic connector. In the aspect shown, orifice 911 has an open vertical portion enabling a user to view indicator 909 on upper magnet 907 and indicator 903 on a lower magnet 905. In this aspect, a valve connector may be provided wherein more than one needles 901, or other fluid transport devices, may be in flow communication with orifices in upper magnet 907 and orifices in lower magnet 905 which may provide alternative flow connections between needles 901 and orifices in microfluidic chip 906. The desired flow communication may be obtained by rotating upper magnet 907 and/or lower magnet 905. Each of the other two orifices 912 may be configured to receive a magnetic connector 902.

Orifices 912 may enable a user to maintain magnetic connectors 902 in a vertical orientation and avoid connector tipping or slipping due to magnetic interactions between the magnetic connectors. Also, orifice 911 may aid in keeping magnetic connectors 905 and 907 aligned. Orifices 911 and 912 may removably hold the magnetic connectors in any desired geometry. Aligners 910 and 913 may served to confine the magnetic connectors against forces between the magnetic connectors or other external lateral forces (e.g., torque from stiff tubing) that may cause the magnetic connectors to collapse into one another, tip, or leak. Such forces may be most detrimental for magnetic connectors having large height to diameter ratios.

Aligner 914 has orifices 913 in a similar configuration as orifices 911 and 912 in aligner 910. Orifices 913 are configured and disposed in aligner 914 to hold magnetic connectors 904 adjacent microfluidic chip 906 wherein each magnetic connector 904 is disposed to magnetically interact with a magnetic connector 902 or valve assembly 905/907. Aligners 910 and 914 allow magnetic connectors 902, 904, and valve assembly 905/907 to slide vertically but not horizontally, with respect to microfluidic chip 906.

EXAMPLE

This example demonstrates the viability of a magnetic connector assembly of the instant disclosure in a microfluidic device, such as the magnetic connector assembly shown in FIG. 3, designed to generate liposomes (tiny bubble-shaped membranes that can be used to transport drugs throughout the body). The chip had five inlets and one outlet, with all inlets connected to syringe pumps via tubing and magnetic connectors. The contact surface of magnetic connectors 202 had a machined semi-circular annular groove where an O-ring was placed (not glued), as shown as seal 322 in FIG. 4. When a connector was placed on top of the chip 206, it was aligned with a magnetic connector 204 on the other side of the wafer 206. The magnetic force between magnetic connectors 202 and 204 sealed the O-ring to the wafer 206, which prevented buffer and IPA (isopropyl alcohol) from leaking.

Phosphate buffered saline packets (pH 7.4, PBS) were purchased from Sigma Aldrich. Isopropyl alcohol (IPA) was purchased from J.T. Baker, Inc. Dimalitoyl phosphatidylcholine (DMPC) and corificesterol were obtained from Avanti Polar Lipids, and dicetyl phosphate (DCP) was obtained from MP Biomedicals. The 100 mm diameter silicon and borosilicate microfluidic chips were obtained from UniversityWafer.com. The free terminus of the tubing was epoxied to the magnetic connector with O-Ring was pressure fitted into 0.2 μm filters attached to a syringe. Five of these syringes were placed in syringe pumps (Harvard Apparatus, Model 11 Pico Plus) that controlled the flow rates. The microfluidic channels were etched in a ~550 μm thick Si wafer using deep reactive ion etching to obtain a width of 65 μm and a depth of ~260 μm. A 500 μm thick borosilicate microfluidic chip with ~1 mm diameter drilled access orifices aligned to the ends of the channels was anodically bonded to the Si wafer. The volumetric flow rate was 200 μL/min with buffer:IPA flow-rate ratios of 49:1, 29:1, and 19:1. The IPA contained a 5:4:1 molar ratio mixture of DMPC:Corificesterol:DCP at a total concentration of 5 mM. The size distributions of the liposomes were obtained using asymmetric flow field-flow fractionation with multiangle laser light scattering (DAWN EOS, Wyatt Technology, Santa Barbara, Calif.) using the Berry plotting formalism to fit the angular static light scattering data.

A solution of lipids were suspended in isopropyl alcohol (IPA) and pumped at a high rate into a microchannel through one inlet and hit with a buffer solution pumped in through four other inlet ports. Lipids self assembled into liposomes as the buffer and IPA streams mix due to convection and diffusion that occurs in a controlled and reproducible manner within microchannels 214. Liposome size distribution may be controlled by the flow rate ratios of buffer to IPA. The inlets and microchannels 214 were configured to introduce the buffer to each side of the flow of the lipids suspended in IPA. The convection and diffusion that occurred as the liquid streams mix produced liposomes that exited the microfluidic device through an outlet port.

The present disclosure may provide new type of connector that makes fluidic connections to microfluidic chips simple, fast and reusable. The connectors may be suitable for many applications. The magnetic connectors may be ideal for rapid prototyping in research environments where flexibility and versatility are important. As the patent literature reflects, many groups and companies are spending resources on developing their own connectors which have a variety of configurations which may not be compatible with one another. The present disclosure may provide standard microfluidic connector and valve assembly. For example, "standard" connectors with different pin numbers similar to the electronic standard sockets may be provided. Specific geometries of magnetic connector aligners, such as those shown in FIG. 9, may be provided to accommodate specific processes, e.g. electrodes for capillary electrophoresis. The magnetic connectors disclosed herein may provide a means to connect microfluidic devices to external pumps and reservoirs configured to deliver liquids into the system. The magnetic connectors and magnetic valves may be inexpensive, reusable, and may provide highly efficient microfluidic connectors. Unlike traditional approaches to connectors, such as gluing the tubing directly to the chip or mounting a male/female connection with the tubing attached to the male portion, the magnetic connectors and valve assemblies disclosed herein may be reusable; may be positioned anywhere on the microfluidic chip; may substantially eliminate the possibility of broken bonds that leak, may substantially eliminate chips and cracks during heat curing of the glue, and substantially eliminate microfluidic devices being made useless by excess glue entering the channels. Additionally, the reliability, flexibility and fast assembly of the magnetic connectors may have advantages over recently developed press-fit systems (where springs produce the sealing force).

The present application was described herein above with reference to one or more embodiments. It is understood that numerous changes as well as variations are possible, without thereby departing from the spirit and scope of the present application or the underlying thought or thoughts of the present application.

The following patents, patent applications, and publications, are hereby incorporated by reference as if set forth in their entirety herein: Provisional Application U.S. Provisional Application No. 61/219,556, entitled "MAGNETIC CONNECTORS FOR MICROFLUIDIC APPLICATIONS", filed Jun. 23, 2009 and "Magnetic connectors for microfluidic applications", by Javier Atencia, Gregory A. Cooksey, Andreas Jahn, Justin M. Zook, Wyatt N. Vreeland and Laurie E. Locascio, Lab Chip, 2010, 10, 246-249, first published Nov. 16, 2009.

The purpose of incorporating U.S. patents applications and other publications is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The invention claimed is:

1. A magnetic connector assembly for microfluidic devices comprising:
   a first magnetic connector comprising a first side surface and a second side surface;
   an orifice extending from said first side surface to said second side surface of said first magnetic connector;
   a microfluidic chip comprising a first side surface and a second side surface;
   an orifice in said first side surface of said microfluidic chip;
   a microchannel in said microfluidic chip in flow communication with said orifice in said first side surface of said first magnetic connector;
   a second magnetic connector configured to magnetically engage said first magnetic connector with microfluidic chip disposed therebetween;
   one of said first magnetic connector and said second magnetic connector comprises at least one of a permanent magnet and an electromagnet and the other of said first magnetic connector and said second magnetic connector comprises at least one of a ferromagnetic material, a permanent magnet, and an electromagnet;
   a seal configured and disposed to seal said first side surface of said first magnetic connector to said first side surface of said microfluidic chip upon said first magnetic connector being placed on said first side surface of said microfluidic chip and said second magnetic connector being placed on said second side surface of said microfluidic chip and disposed to magnetically engage said first magnetic connector;
   said orifice extending from said first side surface to said second side surface of said first magnetic connector being configured to sealingly cooperate with a fluid transport device at its opening in said second side surface, said fluid transport device being configured to provide fluid flow into or out of said orifice and said microchannel, in said microfluidic chip, through said orifice in said first magnetic connector;

said first magnetic connector and said second magnetic connector being axially polarized and configured to provide an attracting force therebetween throughout a full 360° rotation of said first magnetic connector with respect to said second magnetic connector;

said first and said second magnetic connectors being configured to provide a magnetic force therebetween sufficient for sealing said first side surface of said first magnetic connector with said first side surface of said microfluidic chip, with said seal therebetween;

said first and said second magnetic connectors being configured to provide a magnetic force therebetween wherein said first magnetic connector is releasable from said first side surface of said microfluidic chip upon a force being applied by hand to said first or said second magnetic connector.

2. The magnetic connector assembly for microfluidic devices of claim 1 wherein:

said first magnetic connector comprises an axially polarized first permanent magnet;

said second magnetic connector comprises an axially polarized second permanent magnet;

a first ferromagnetic cup disposed about said first permanent magnet;

said first ferromagnetic cup having an axial polarity opposite the axial polarity of said first axially polarized magnet;

a second ferromagnetic cup disposed about said second permanent magnet;

said second ferromagnetic cup having an axial polarity opposite the axial polarity of said second axially polarized permanent magnet; and said first and said second axially polarized ferromagnetic cups being configured to provide an attracting force therebetween throughout a full 360° rotation of said first magnetic connector with respect to said second magnetic connector.

3. A connector assembly for microfluidic devices comprising:

a first connector comprising a first side surface and a second side surface;

a second connector configured to magnetically engage said first connector with a microfluidic chip therebetween;

said first side surface of said first connector being configured to sealingly engage a first side surface of said microfluidic chip upon said first and second connectors being placed on opposing side surfaces of said microfluidic chip and disposed to magnetically engage each other;

at least one orifice extending from said first side surface to said second side surface of said first connector configured to be disposed in flow communication with at least one orifice in said first side surface of said microfluidic chip;

said first and said second connectors being configured to provide an attracting magnetic force therebetween greater than a separating force between said first side surface of said microfluidic chip and said first side surface of said first connector caused by a fluid pressure in said at least one orifice in said first connector or in the at least one orifice in said microfluidic chip; and at least one of said first connector and said second connector comprising a magnet.

4. The connector assembly of claim 3 wherein one of said first connector and said second connector comprises at least one electromagnet or at least one permanent magnet and the other of said first connector and said second connector comprises a ferromagnetic material.

5. The connector assembly of claim 3 wherein each of said first connector and said second connector comprise at least one magnet.

6. The connector assembly of claim 3 wherein at least one of said orifices extending from said first side surface to said second side surface of said first connector is disposed to be in flow communication with at least one of said orifices in said first side surface of said microfluidic chip upon said first connector being in a first rotational position with respect to said first side surface of said microfluidic chip and at least one of said orifices extending from said first side surface to said second side surface of said first connector being disposed to not be in flow communication with at least one of said orifices in said first side surface of said microfluidic chip upon said first connector being in a second rotational position with respect to said first side surface of said microfluidic chip; and said first and said second connectors being configured to provide an attracting magnetic force therebetween greater than a separating force between said first side surface of said microfluidic chip and said first side surface of said first connector upon a fluid pressure therebetween.

7. The connector assembly for microfluidic devices of claim 3 wherein:

said first connector comprises a first orifice and a second orifice extending from said first side surface to said second side surface of said first connector;

said first orifice extending from said first side surface to said second side surface of said first connector being disposed to be in flow communication with an orifice in said first side surface of said microfluidic chip upon said first connector being in a first rotational position with respect to said first side surface of said microfluidic chip;

said second orifice extending from said first side surface to said second side surface of said first connector being disposed to be in flow communication with an orifice in said first side surface of said microfluidic chip upon said first connector being in a second rotational position with respect to said first side surface of said microfluidic chip; and said first or said second orifice extending from said first side surface to said second side surface of said first connector being disposed not to be in flow communication with an orifice in said first side surface of said microfluidic chip upon said first connector being in said first or said second rotational position with respect to said first side surface of said microfluidic chip.

8. The connector assembly for microfluidic devices of claim 3 wherein:

said first connector comprises a first orifice and a second orifice extending from said first side surface to said second side surface of said first connector;

said microfluidic chip comprises a first orifice and a second orifice in said first side surface of said microfluidic chip;

said first orifice extending from said first side surface to said second side surface of said first connector being disposed to be in flow communication with said first or said second orifice in said first side surface of said microfluidic chip upon said first connector being in a first rotational position with respect to said first side surface of said microfluidic chip; and said second orifice extending from said first side surface to said second side surface of said first connector being disposed to be in flow communication with said first or said second orifice in said first side surface of said microfluidic chip upon said first connector being in a second rotational position with respect to said first side surface of said microfluidic chip.

9. The connector assembly for microfluidic devices of claim 8 wherein said first connector and said first side surface of said microfluidic chip each comprise at least one alignment feature, said at least one alignment feature on said first connector being configured to align in a first aligning orientation with said at least one alignment feature on said microfluidic chip upon said first connector being in said first rotational position with respect to said first side surface of said microfluidic chip and said at least one alignment feature on said first connector being configured to align in a second aligning orientation with said at least one alignment feature on said microfluidic chip upon said first connector being in said second rotational position with respect to said first side surface of said microfluidic chip, said first and said second aligning orientations being different.

10. The connector assembly for microfluidic devices of claim 8 wherein:
said first orifice extending from said first side surface to said second side surface of said first connector being disposed to be in flow communication with said first or said second orifice in said first side surface of said microfluidic chip and said second orifice extending from said first side surface to said second side surface of said first connector being disposed to be in flow communication with the other of said first and said second orifice in said first side surface of said microfluidic chip upon said first connector being in a third rotational position with respect to said first side surface of said microfluidic chip.

11. The connector assembly for microfluidic devices of claim 3 further comprising:
a third connector comprising a first side surface and a second side surface and configured to magnetically engage said first connector;
a first orifice and a second orifice extending from said first side surface to said second side surface of said third connector;
said second side surface of said first connector being configured to sealingly engage said first side surface of said third connector upon magnetic engagement of said third connector with said first connector;
one of said at least one orifice extending from said first side surface to said second side surface of said first connector being disposed to be in flow communication with said first or said second orifice extending from said first side surface to said second side surface of said third connector upon said third connector being in a first rotational position with respect to said second side surface of said first connector; and
one of said at least one orifice extending from said first side surface to said second side surface of said first connector being disposed to be in flow communication with the other of said first and said second orifice extending from said first side surface to said second side surface of said third connector upon said third connector being in a second rotational position with respect to said second side surface of said first connector.

12. The connector assembly for microfluidic devices of claim 3 wherein said first connector comprises a first axially polarized magnet and said second connector comprises a second axially polarized magnet, said first and said second axially polarized magnets being configured to provide an attracting force therebetween throughout a full 360° rotation of said first connector with respect to said second connector.

13. The connector assembly for microfluidic devices of claim 12 further comprising:
a first ferromagnetic cup disposed about said first magnet;
a second ferromagnetic cup disposed about said second magnet; and
said first and said second ferromagnetic cups being configured to confine a magnetic field and increase a magnetic flux density of said first and said second connectors.

14. The connector assembly for microfluidic devices of claim 3 wherein said first connector comprises a first diametrically polarized magnet and said second connector comprises a second diametrically polarized magnet, said first and said second diametrically polarized magnets being configured to provide a maximum attracting force therebetween at a first rotational orientation of said first connector with respect to said second connector and a maximum repelling force therebetween at a second rotational orientation of said first connector with respect to said second connector.

15. The connector assembly for microfluidic devices of claim 3 further comprising a seal configured and disposed to releasably seal said first side surface of said first connector to said first side surface of said microfluidic chip.

16. The connector assembly for microfluidic devices of claim 3 wherein each said at least one orifice extending from said first side surface to said second side surface of said first connector is configured to sealingly cooperate with a fluid transport device at its opening in said second side surface of said first connector, said fluid transport device being configured to provide fluid flow into or out of said orifice in said microfluidic chip through said at least one orifice in said first connector.

17. The connector assembly for microfluidic devices of claim 3 wherein said first and said second connectors are configured to provide a magnetic force therebetween sufficient to seal said first side surface of said first connector with said first side surface of said microfluidic chip with a fluid pressure of at least 100 psig therebetween.

18. The connector assembly for microfluidic devices of claim 17 wherein said first and said second connectors are configured to provide a magnetic force therebetween wherein said first connector is releasable from first side surface of said microfluidic chip upon an axial or rotational force being applied by hand to said first connector.

19. A valve assembly for microfluidic devices comprising:
a first connector comprising a first side surface and a second side surface;
said first connector comprising a first orifice extending from an off center portion of said first side surface to said second side surface of said first connector;
said first orifice of said first connector being configured to sealingly cooperate with a fluid transport device at its opening in said second side surface;
a second connector comprising a first side surface and a second side surface;
said second connector comprising a first orifice extending from an off center portion of said first side surface to said second side surface of said second connector;
said first orifice of said second connector being configured to sealingly cooperate with a fluid transport device at its opening in said second side surface;
said first connector being configured to magnetically engage said second connector and to rotatingly seal said first side surface of said first connector to said first side surface of said second connector upon magnetic engagement of said first connector with said second connector;

said first orifice of said first connector being disposed to be in flow communication with said first orifice of said second connector upon said first connector being in a first rotational position with respect to said second connector;

said first orifice of said first connector being disposed to not be in flow communication with said first orifice of said second connector upon said first connector being in a second rotational position with respect to said second connector;

said first and said second connectors being configured to provide a magnetic force therebetween sufficient to form a seal between said first side surface of said first connector and said first side surface of said second connector;

said first and said second connectors being configured to provide a magnetic force therebetween wherein said first connector is releasable from said second connector upon an axial or rotational force being applied by hand to said first or said second connector; and at least one of said first connector and said second connector comprising a magnet.

20. The valve assembly for microfluidic devices of claim 19 wherein said first connector and said second connector each comprise at least one alignment feature, said at least one alignment feature on said first connector being configured to align in a first aligning orientation with said at least one alignment feature on said second connector upon said first connector being in said first rotational position with respect to said second connector and said at least one alignment feature on said first connector being configured to align in a second aligning orientation with said at least one alignment feature on said second connector upon said first connector being in said second rotational position with respect to said second connector, said first and said second aligning orientations being different.

* * * * *